US006640317B1

(12) United States Patent
Snow

(10) Patent No.: US 6,640,317 B1
(45) Date of Patent: Oct. 28, 2003

(54) MECHANISM FOR AUTOMATED GENERIC APPLICATION DAMAGE DETECTION AND REPAIR IN STRONGLY ENCAPSULATED APPLICATION

(75) Inventor: Paul Alan Snow, Richland, WA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/552,862

(22) Filed: Apr. 20, 2000

(51) Int. Cl.[7] .............................. H02H 3/05; G06F 9/44
(52) U.S. Cl. .......................... 714/38; 717/124; 717/174
(58) Field of Search ................................ 714/6, 15, 38, 714/39, 42, 44; 707/103 R; 717/168–178, 124

(56) References Cited

U.S. PATENT DOCUMENTS

| | | | | |
|---|---|---|---|---|
| 3,711,863 A | * | 1/1973 | Bloom | 714/38 |
| 5,001,628 A | | 3/1991 | Johnson et al. | 364/200 |
| 5,497,484 A | | 3/1996 | Potter et al. | 395/600 |
| 5,745,669 A | * | 4/1998 | Hugard et al. | 714/3 |
| 5,832,266 A | | 11/1998 | Crow et al. | 395/700 |
| 5,867,714 A | * | 2/1999 | Todd et al. | 717/172 |
| 5,951,698 A | * | 9/1999 | Chen et al. | 714/38 |
| 6,122,639 A | * | 9/2000 | Babu et al. | 707/103 R |
| 6,230,284 B1 | * | 5/2001 | Lillevold | 714/13 |
| 6,351,752 B1 | * | 2/2002 | Cousins et al. | 707/103 R |
| 6,356,933 B2 | * | 3/2002 | Mitchell et al. | 709/203 |
| 6,480,944 B2 | * | 11/2002 | Bradshaw et al. | 711/162 |

* cited by examiner

Primary Examiner—Robert Beausoliel
Assistant Examiner—Emerson Puente
(74) Attorney, Agent, or Firm—Duke W. Yee; David A. Mims, Jr.; Stephen R. Loe

(57) ABSTRACT

A method, system, and apparatus for detecting and repairing damaged portions of a computer system is provided. In a preferred embodiment of the present invention, a damage detection and repair facility monitors and detects changes to the computer system. The damage detection and repair facility compares these changes to the set of constraints defined by the working definitions for each application installed on the computer system. The working definitions define the invariant portions of each application and define the constraints placed upon the computer system by each application. Responsive to changes that are in conflict with this set of constraints, the damage detection and repair facility makes such changes in the persistent storage so as to resolve these conflicts. This may be done, for example, by repairing a damaged file, installing a missing driver, or adjusting an environment variable.

33 Claims, 6 Drawing Sheets

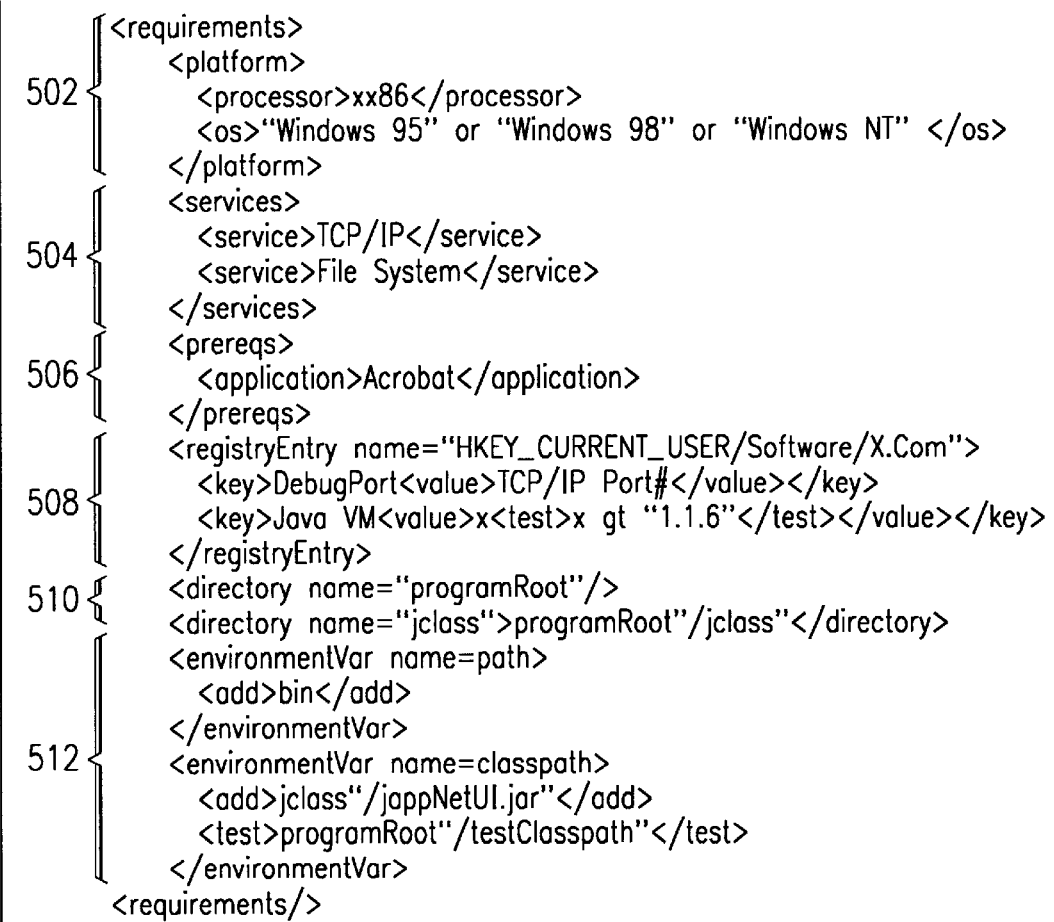

```
   ⎧ <requirements>
   |    <platform>
502⎨       <processor>xx86</processor>
   |       <os>"Windows 95" or "Windows 98" or "Windows NT" </os>
   ⎩    </platform>
   ⎧    <services>
504⎨       <service>TCP/IP</service>
   |       <service>File System</service>
   ⎩    </services>
   ⎧    <prereqs>
506⎨       <application>Acrobat</application>
   ⎩    </prereqs>
   ⎧    <registryEntry name="HKEY_CURRENT_USER/Software/X.Com">
508⎨       <key>DebugPort<value>TCP/IP Port#</value></key>
   |       <key>Java VM<value>x<test>x gt "1.1.6"</test></value></key>
   ⎩    </registryEntry>
510{    <directory name="programRoot"/>
       <directory name="jclass">programRoot"/jclass"</directory>
   ⎧    <environmentVar name=path>
   |       <add>bin</add>
   |    </environmentVar>
512⎨    <environmentVar name=classpath>
   |       <add>jclass"/jappNetUI.jar"</add>
   |       <test>programRoot"/testClasspath"</test>
   ⎩    </environmentVar>
     <requirements/>
```

FIG. 5

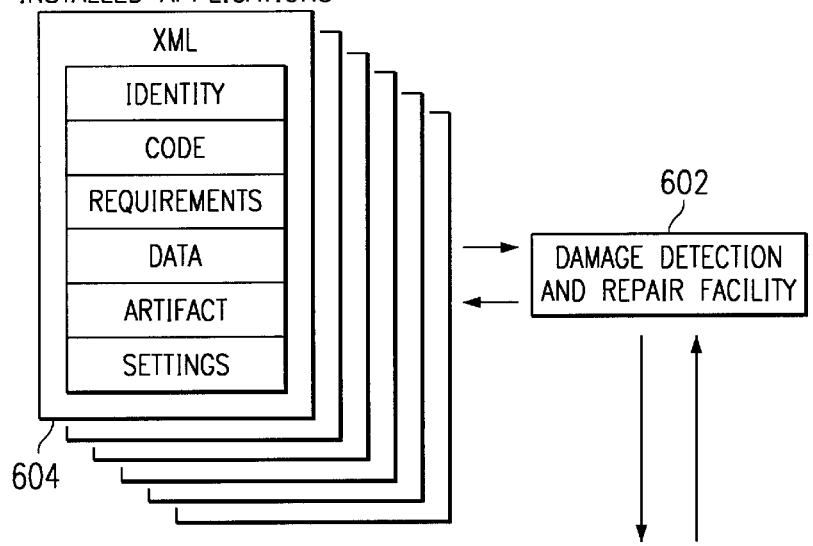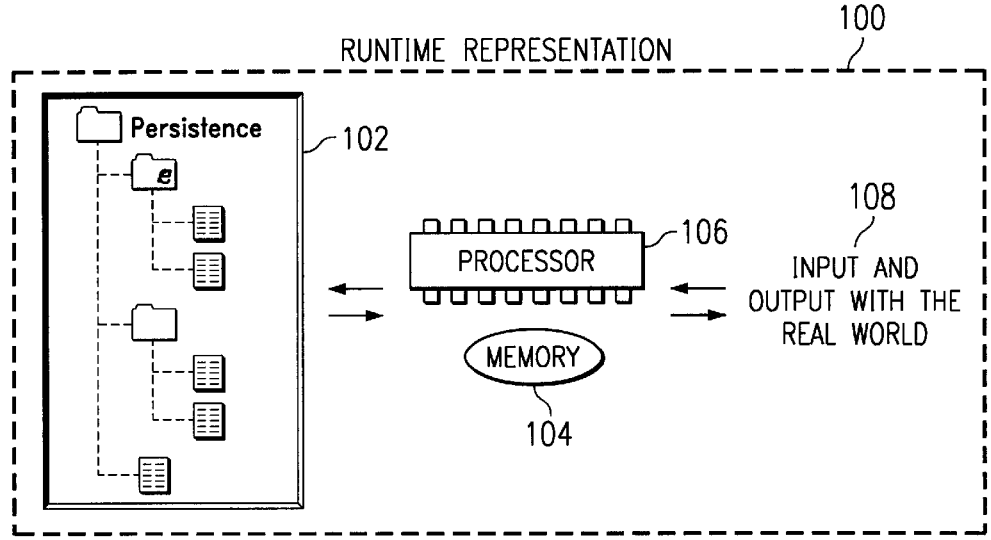
FIG. 6

MECHANISM FOR AUTOMATED GENERIC APPLICATION DAMAGE DETECTION AND REPAIR IN STRONGLY ENCAPSULATED APPLICATION

CROSS REFERENCE TO RELATED APPLICATIONS

The present application is related to co-pending U.S. patent application Ser. No. 09/552,863 entitled "Strongly Encapsulated Environments for the Development, Deployment, and Management of Complex Application configurations" filed even date herewith, now abandoned to co-pending U.S. patent application Ser. No. 09/552,864 entitled "A Method for Creating Encapsulated Applications with Controlled Separation form an Application's Runtime Representation" filed even date herewith, and to co-pending U.S. patent application Ser. No. 09/552,861 entitled "An Application Development Server and a Mechanism for Providing Different Views into the Same Constructs within a Strongly Encapsulated Environment" filed even date herewith. The content of the above mentioned commonly assigned, co-pending U.S. Patent applications are hereby incorporated herein by reference for all purposes.

BACKGROUND OF THE INVENTION

1. Technical Field

The present invention relates generally to the field of computer software and, more particularly, to methods of detecting and repairing damaged files and settings within a data processing system.

2. Description of Related Art

Currently, computer systems are built up through a series of installations provided by different software developers, each of which installs one or more different software components. There is no industry standard way to describe what comprises an application. Without this description, there is no way to implement a standard service that can protect the integrity of each application.

There is a need for a standard, simple, scalable, platform independent mechanism for detecting damaged applications and repairing them. Applications can be damaged in a variety of ways. Each of the following operations can damage one or more applications within a computer system:

Installation of new applications

Reconfiguring applications

The use of an application

Application error

User error

Viruses

Installation is dangerous because the current approach in the industry is a rather ad hock approach in which the responsibility for the installation procedure for each application rests with each application's developer. During installation, any error or conflict between any two or more applications may potentially corrupt the computer system configuration. Applications do not have access to the requirements and dependencies of the other applications already installed on the target computer system. Without this information, no modification to a computer system's files and settings can be made completely safe. Yet the modification of files and settings is required to install applications onto computer systems.

The reconfiguring of an application may also require that changes be made to files and configuration settings needed or used by other applications, and such changes may render one or more of the other applications inoperable.

The use of applications may also require that the files and settings within a computer system be updated from time to time. This requires applications to be "well behaved" with respect to each other. Conflicts may still occur, either by chance, or error within an application. Yet the application developer's priority is always to their application without regard to potential conflicts with other applications, except to insure their application wins such conflicts. Because the requirements and constraints of each application are not defined, each developer also becomes responsible for supporting the configuration management of every system on which the application is installed, and for handling conflicts in all configurations in which their application may be used. However, this responsibility is rarely, if ever, each application developer's top priority.

The current system of deploying and running applications defines only very weak barriers between applications to prevent a given application from damaging other applications. Any conflict, if handled in the given application's favor, may prevent a competitor's application from running. This state of affairs provides little motivation to avoid conflicts with a competitor's application so long as the developer's own application can be configured properly. Each application is dependent on its own installation and runtime code to verify its configuration and access to prerequisite devices, drivers, applications, and system settings.

Users themselves may cause problems by modifying files or configuration settings, either by accident, failure to follow a procedure properly, etc. Often all the files and configuration settings are exposed to modification by the user.

In reality, virus attacks account for a very small percentage of all application failures. Yet a viral attack can result in a huge amount of damage.

Currently the generally accepted method of protecting a computer system from damage from outside viral attacks is through the use of third party vendor virus protection software products. However, these products must be updated frequently to be able to detect the latest viruses. Any new virus that has been created since the software was updated may be undetected by the virus protection software, thus enabling that virus to corrupt or destroy files necessary for the proper performance of the computer.

Therefore, there is a need for a method, system and apparatus that automatically detects damaged files and applications and restore them to their proper condition.

SUMMARY OF THE INVENTION

The present application provides a method, system, and apparatus for detecting and repairing damaged portions of a computer system. In a preferred embodiment of the present invention, a damage detection and repair facility monitors and detects changes to the computer system. The damage detection and repair facility compares these changes to the set of constraints defined by the working definitions for each application installed on the computer system. The working definitions define the invariant portions of each application and define the constraints placed upon the computer system by each application. Responsive to changes that are in conflict with this set of constraints, the damage detection and repair facility makes such changes in the persistent storage so as to resolve these conflicts. This may be done, for example, by repairing a damaged file, installing a missing driver, or adjusting an environment variable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a portion of XML code demonstrating one method the requirements part of the working definition may be represented in accordance with a preferred embodiment of the present invention;

FIG. 6 depicts a block diagram illustrating a method of automated damage detection and repair within a computing system in accordance with a preferred embodiment of the present invention.

DETAILED DESCRIPTION OF THE PREFERRED EMBODIMENT

Figure 1:
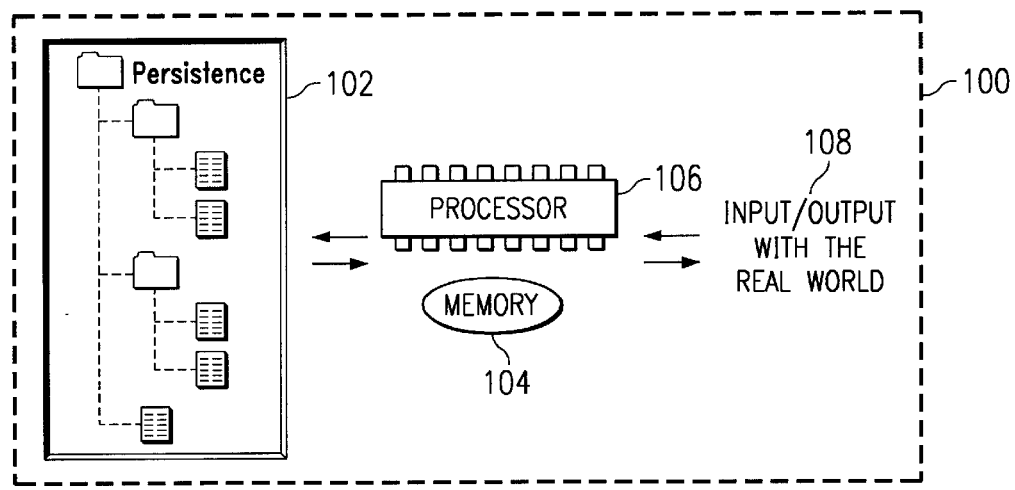
FIG. 1 depicts a block diagram illustrating a basic prior art computer architecture structure.

With reference now to the figures and, in particular, with reference to FIG. 1, a block diagram illustrating a basic prior art computer architecture structure is depicted. Before proceeding, it should be noted that throughout this description, identical reference numbers refer to similar or identical features in the different Figures.

All existing computer architectures are patterned after a core, basic computer architecture 100. This core, basic computer architecture is comprised of four elements: one or more processors 106, one or more memory spaces 104, one or more mechanisms for managing input/output 108, and one or more mechanisms for defining persistence 102. The Processor(s) 106 perform(s) the computations and instructions of a given application by loading its initial state into memory from the persisted image for that application.

Persistence 102 is the persisted storage of the applications apart from memory 104. The basic nature of computer systems requires that all applications be stored somewhere. Even if a person types a program into a computer system every time they wish to use that program, the program is always stored somewhere, even if that storage is in someone's head. How an application is stored does not vary much from platform to platform. Applications are stored as, for example, executable files and libraries, files, databases, registry entries, and environment variables. Typically these files, databases, etc. are stored on a physical nonvolatile storage device such as, for example, Read only Memory chips, a hard disk, a tape, CD-ROM, or a DVD. Even in the most complex applications, the number of distinct persisted structures is really rather small, although there can be many of each type.

Regardless of the application's complexity, it depends on its persisted image. If the persisted structure is correct, the application will execute. If the persisted structure is wrong, the application will not execute.

Figure 2:
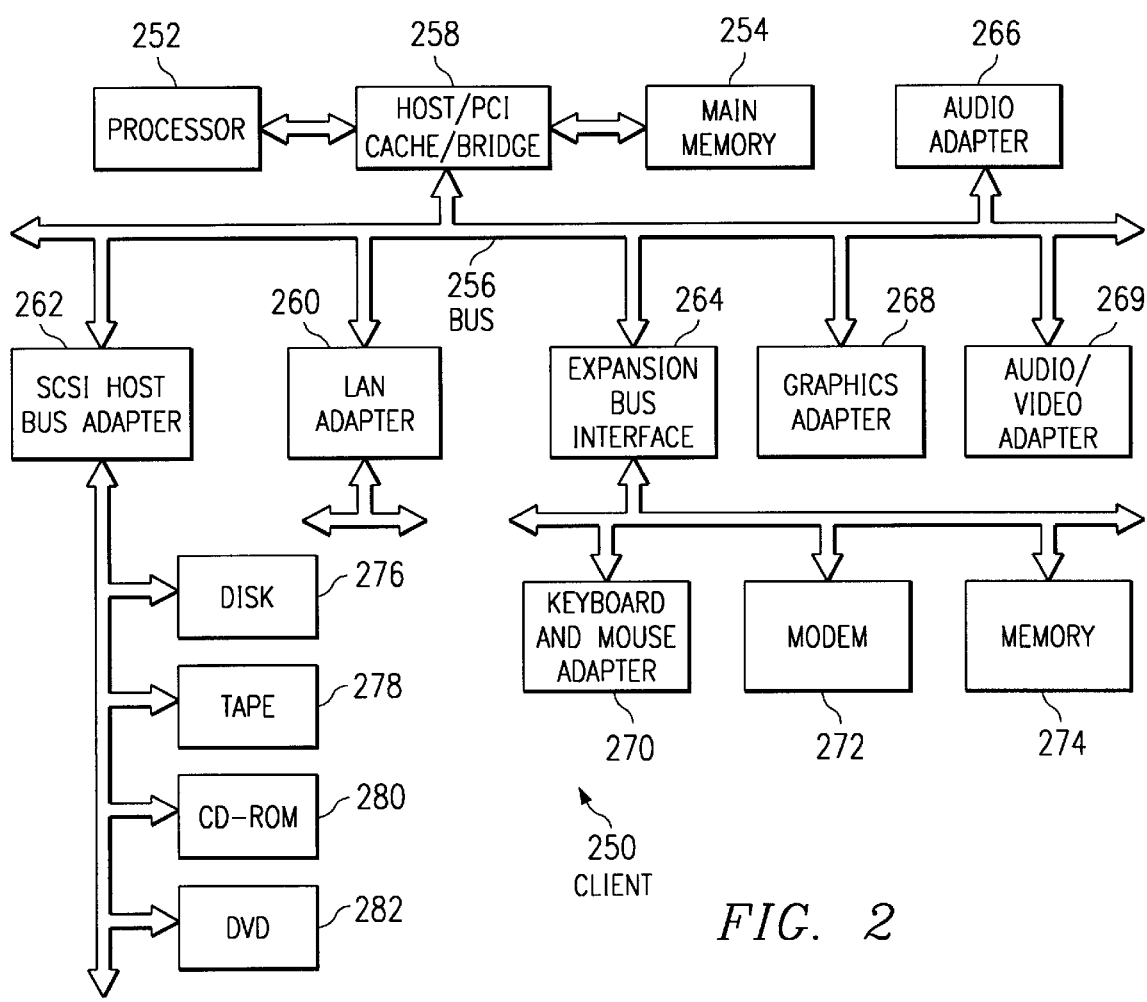
FIG. 2 depicts a block diagram of a data processing system in which the present invention may be implemented.

With reference now to FIG. 2, a block diagram of a data processing system in which the present invention may be implemented is illustrated. Data processing system 250 is an example of a computer which conforms to the architecture depicted in FIG. 1. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2. The operating system may be a commercially available operating system such as JavaOS For Business or OS/2, which are available from International Business Machines Corporation. Those of ordinary skill in the art will appreciate that the hardware in FIG. 2 may vary depending on the implementation. For example, other peripheral devices, such as optical disk drives and the like may be used in addition to or in place of the hardware depicted in FIG. 2. The depicted example is not meant to imply architectural limitations with respect to the present invention. For example, the processes of the present invention may be applied to a multiprocessor data processing system.

Figure 3:
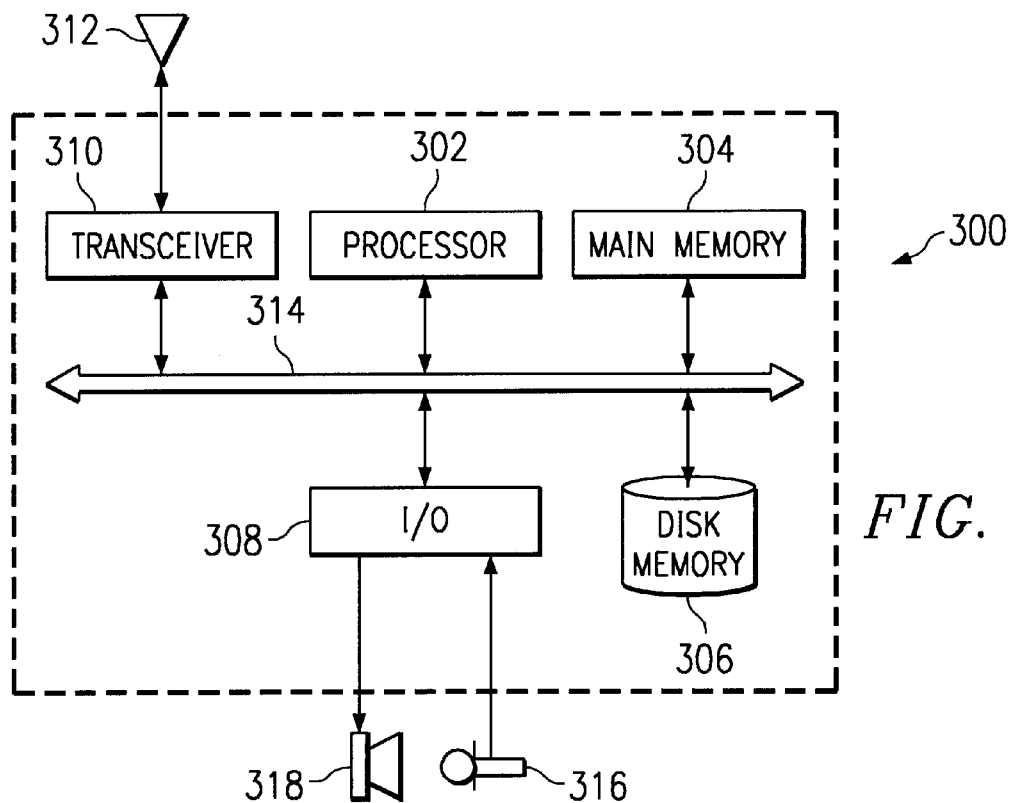
FIG. 3 depicts a block diagram of a personal digital assistant (PDA) in which the present invention may be implemented.

Turning now to FIG. 3, a block diagram of a personal digital assistant (PDA) is illustrated in which the present invention may be implemented. A PDA is a data processing system (i.e., a computer) which is small and portable. As with the computer depicted in FIG. 2, and as with all computers, PDA 300 conforms to the computer architecture depicted in FIG. 1. The PDA is typically a palmtop computer, such as, for example, a Palm VII®, a product and registered trademark of 3Com Corporation in Santa Clara, Calif., which may be connected to a wireless communications network and which may provide voice, fax, e-mail, and/or other types of communication. The PDA 300 may perform other types of facilities to the user as well, such as, for example, provide a calendar and day planner. The PDA 300 may have one or more processors 302, such as a microprocessor, a main memory 304, a disk memory 306, and an I/O 308 such as a mouse, keyboard, or pen-type input, and a screen or monitor. The PDA 300 may also have a wireless transceiver 310 connected to an antenna 312 configured to transmit and receive wireless communications. The processor 302, memories 304, 306, I/O 308, and transceiver are connected to a bus 304. The bus transfers data, i.e., instructions and information, between each of the devices connected to it. The I/O 308 may permit faxes, e-mail, or optical images to be displayed on a monitor or printed out by a printer. The I/O 308 may be connected to a microphone 316 and a speaker 318 so that voice or sound information may be sent and received.

The computers depicted in FIGS. 2 and 3 are examples of computers that conform to the computer architecture paradigm depicted in FIG. 1. The sophistication of the system, number of components, and speed of the processor may vary, but the basic model is the same as the architecture 100 depicted in FIG. 1: means for input and output such as a keyboard and display (whether LED or a video display terminal), a processor, memory, and persistence. The persistence may be, for example, stored on a hard disk or hard wired into the system. However, the computers depicted in FIGS. 2 and 3 are merely examples. Other computers, in fact all current computers, also conform to this model. Examples of other such computers include, but are not limited to, main frame computers, work stations, laptop computers, and game consoles, both portable and conventional game consoles that connect to a television. Examples of game consoles include, for example, a Sony Playstation® and a Nintendo Gameboy®. Playstation is a trademarked product of Sony Corporation of Tokyo, Japan. Gameboy is a product and a registered trademark of Nintendo of America, Inc. of Redmond, Wash., a wholly owned subsidiary of Nintendo Co., Ltd., of Kyoto, Japan.

The computer of FIG. 2 and the PDA of FIG. 3 are also suitable to implement the data structures, methods, and apparatus of the present invention. The present invention modifies the computer architecture paradigm illustrated in FIG. 1 in a way such as to present a new computer architecture paradigm with features and advantages as described below.

The present invention provides a data structure, process, system, and apparatus for allowing applications and computer systems to configure and manage themselves. The present invention also provides a process, system, and apparatus for creating encapsulated applications with controlled separation from an application's runtime representation. This separation is critical and necessary. The application's Encapsulation is provided by the Working Definition for the application, while the runtime image allows the application to execute within traditional execution environments, as defined by Windows, Unix, OS/2, and other operating system platforms.

Figure 4A:
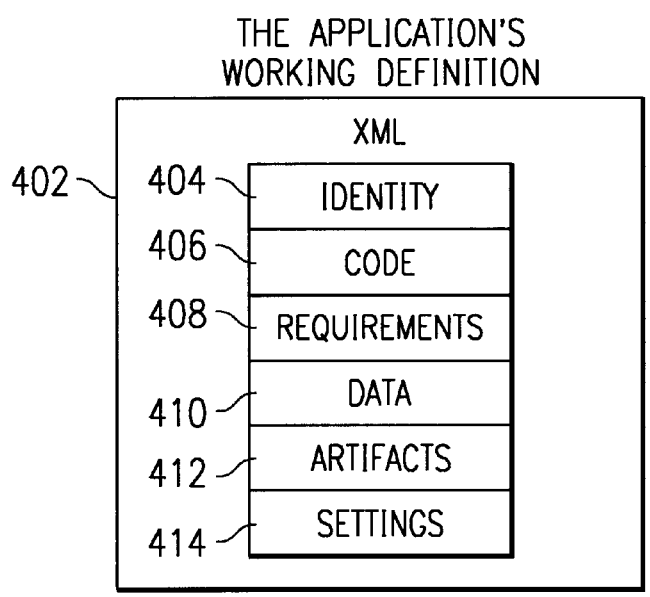
FIG. 4A depicts a block diagram illustrating a data structure for strongly encapsulating an application in accordance with the present invention.

With reference now to FIG. 4A, a block diagram illustrating a data structure for strongly encapsulating an application is depicted in accordance with the present invention. In a preferred embodiment, any software application may consist of the following elements: identity 404, code 406, requirements 408, data 410, artifacts 412, and settings 414. These elements structure the application's defining characteristics. The defining characteristics define the persisted state, settings, and structures required to build a valid runtime representation of the application within its targeted computer system. The application's working definition documents and controls each of these elements of the application.

The application's identity 404 is defined by the application developer, and consists of the application's name, version, etc. The identity section 404 may also provide documentation, web links, etc. for the application useful both to automated management services and users.

The code 406 represents the executable images, files, source code, and any other representation of the executable portion of the application that the application developer may decide to use. The code section 406 may also include executable images, files, source code, etc. to enable the installation, maintenance, configuration, uninstall, etc. of the application through the application's life cycle.

The requirements section 408 defines what directory structures, environment variables, registry settings, and other persisted structures must exist and in what form for this application to be properly constructed and installed in the persisted image of a computer system. The requirements section 408 also details any services and applications that are required to support this application. The requirements section 408 details these concepts as a set of constraints, and also may define the order in which these constraints must be resolved when such order is required. The requirements 408 also define the circumstances and constraints for the use of application specific installation, maintenance, configuration, uninstall, etc. code.

The Data section 410 defines data tables, configuration files, and other persisted structures for the application. The data section 410 is used to hold UI preferences, routing tables, and other information that makes the application more usable.

The Artifacts 412 are the persisted form of the value provided by the application. Examples of Artifacts 412 include documents, spreadsheets, databases, mail folders, text files, image files, web pages, etc. These are the files that contain the user's work ("user" in this context can be human or application).

The settings 414 are the persisted structures created or modified within the runtime representation that are intended to satisfy the requirements for the application. A distinction is drawn between the requirements 408 (which may specify a range of values in a registry setting or the form a directory structure must conform to) and the actual solution constructed in the runtime image 100 to satisfy these requirements.

The Requirements 408 are provided by the developers, application management software, environments, etc. Settings are made in an effort to resolve those requirements, and identify what requirements a setting is intended to satisfy.

Figure 4B:
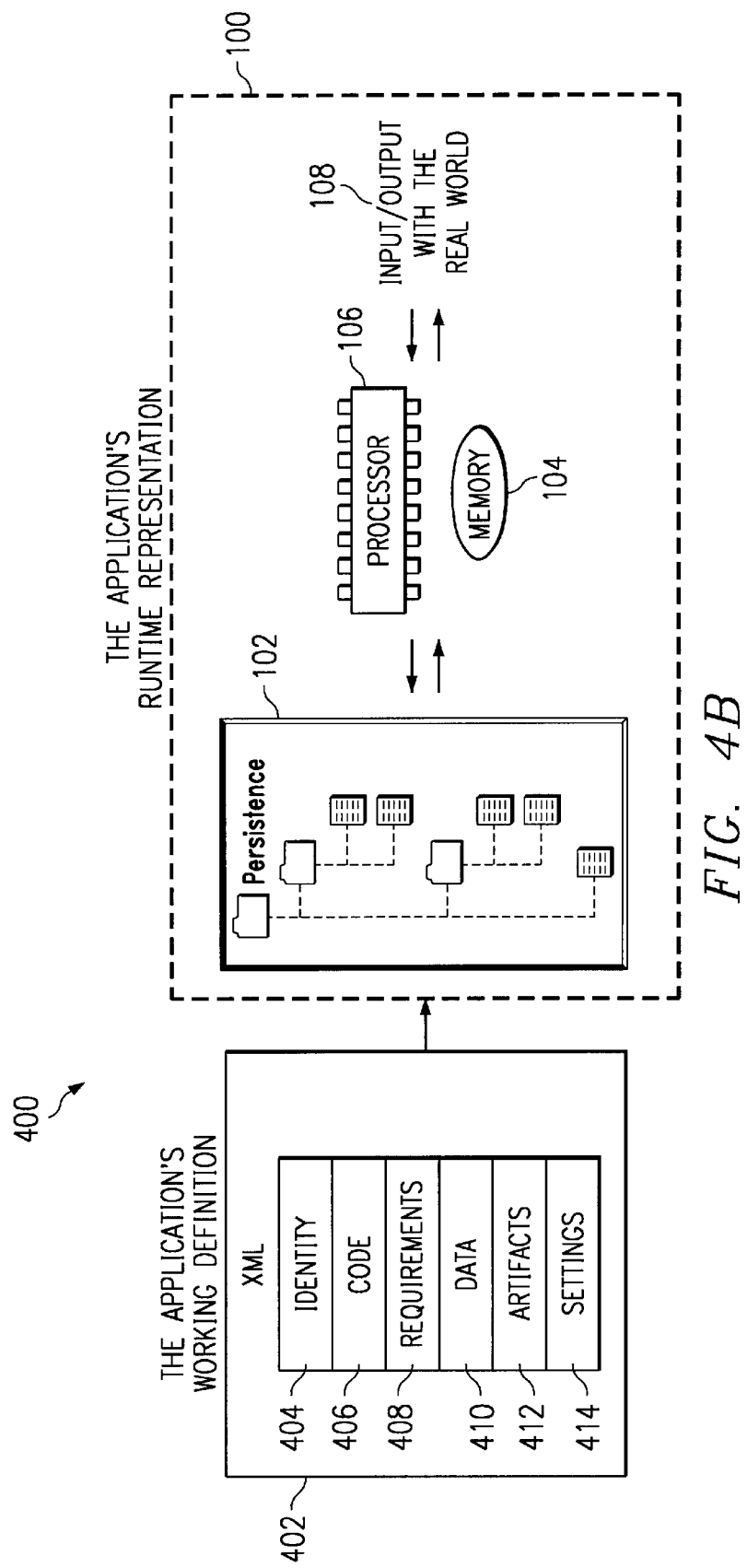
FIG. 4B depicts a block diagram of a new model for a computer architecture in accordance with a preferred embodiment of the present invention.

With reference now to FIG. 4B, a block diagram of a new model for a computer architecture 400 is depicted in accordance with a preferred embodiment of the present invention. The new computer architecture 400 of the present invention builds on the standard architecture as depicted in FIG. 1. However, the new computer architecture 400 also includes an application's working definition 402. In a preferred embodiment, an application's Working definition 402 is an extensible markup language (XML) representation of the identity 404, code 406, requirements 408, data 410, artifacts 412, and settings 414; that is it includes all of the defining characteristics for the application. By defining these elements, separate from the runtime representation 100 of an application, working definitions 402 provides a way to strongly encapsulate an application which is compatible with operating systems that expect applications in an unencapsulated form. Working definitions define a new, universal picture of a computer system. Working definitions do not interfere with any operating system or platform because they have no active behavior. Working definitions define the application's runtime representation 100 by defining what an application is, what it requires, and what was done to give it what it needs, within a given computer system. While working definitions have no active behavior, they enable the implementation of a variety of automated services. These services include application life cycle management, resource tracking, application installation, damage detection and repair, computer system optimization, etc.

Strong encapsulation of state greatly reduces the global complexity of a computer system. States such as, for example, path requirements, file extensions, registry settings, program files, can be maintained in a pure state outside of the runtime representation 100. Because the runtime version of the application 100 is a redundant representation, it can be reconstructed, and fixed using the encapsulated version of the application as the standard. Important modifications can be persisted back to the application's Working Definition as a background task.

Working definitions use XML to define a flexible format for structuring the critical information about an application, thus encapsulating the application. XML provides the ability to extend working definitions to fit future requirements and, XML, just like the hypertext markup language (HTML) of the world wide web, can be as simple or as complex as the job requires. The actual size of a working definition is very small compared to the application it defines, even if the application is just a batch file. At the same time, working definitions can be used to describe vast, distributed, multi-platform applications.

Working definitions are platform and technology independent and address universal configuration issues. Furthermore, working definitions can be used as an open standard. Working definitions provide configuration information to services and to applications as well as providing bookkeeping support.

An application's valid runtime representation is one that satisfies a finite, structured set of constraints. Therefore, XML is an ideal method because XML provides an ideal representation for structured data and supports the ability to define links that allow tracking of internal relationships or for including references to structures defined externally. Furthermore, XML is designed to be easily extended and is platform independent.

However, XML is not a good representation for constant modification and access. The runtime representation for the application provides the application with an efficient executable representation. To provide an application with an efficient executable representation, the XML can detail the required runtime structure and requirements for the application. Using these instructions, the application can be constructed and executed automatically. Prerequisites, in the proper order and with the proper configuration will also be constructed and executed automatically.

As the application executes, changes made to the application's state may be made as they are presently, that is, to the runtime representation. The XML specifies the important files to be persisted, and this persistence may be done in the background. The overhead is thus very minimal with little effect on the performance as viewed from a user's perspective.

The nature of the problem of automating management and configuration of computer systems requires a common, computer friendly and people friendly, complete representation of each software component. Without this information, the automated management of computer systems is not possible.

While the working definitions have been described herein and will be described henceforth with reference to an XML representation of the application, any number of other technologies and approaches might be used as well as will be obvious to one of ordinary skilled in the art. For example, encapsulation could also be implemented using databases or with Zip files. Also, a database could be used for the actual implementation of the support for the encapsulation with XML used as a transfer protocol.

Furthermore, although described primarily with reference to constructing Working Definitions using XML, Working Definitions may be constructed using any structured format. Possible choices, for example, include the use of other structured forms. These include:

Object based technologies (Java Beans, CORBA objects, C++ objects, etc.). These would have to be backed by some sort of database.

Object Oriented databases. These are a mix of databases and Object based technologies.

Functional technologies. One could build a PostScript-like or Lisp-like language (compiled or interpreted) that defines these structures.

Rule based technologies. Since Working Definitions generally resolve sets of constraints, this may well be the best way of implementing services that execution against the constraints that Working Definitions define. Working definitions could be constructed directly into Rule form, similar to forward chainning technologies such as ART, or backward chainning technologies such as Prolog.

Tagged formats. XML is an example of a tagged format. However, there are other tagged formats that would work just as well. Tagged Image Format (TIFF), although generally used for defining images, may also be used to define Working Definitions since the use of custom tags is supported. Additionally, since TIFF is a binary format, it could hold the executable code and binary data. Other tagged formats include SGML, TeX, and LaTex.

In addition to these examples of structured formats, there are certainly other formats and representations that would also work for constructing Working Definitions. Any technology that can 1) represent structured data, 2) support links to outside sources, and 3) can be used across platforms could be used to define Working Definitions.

With reference now to FIG. 5, a portion of XML code is shown, demonstrating one method for representing the requirements element of the working definition, in accordance with a preferred embodiment of the present invention. The portion 500 of XML depicted is only snippet of a representation of the requirements element of the working definition and is given merely as an example. Furthermore, this portion 500 of XML is overly simplified, but does demonstrate how this information might be represented.

Platform tag at 502 reflects the requirement of the application that the platform be an xx86 type of computer, such as, for example, an Intel Pentium® class computer, running a Windows 95™, Windows 98™, or Windows NT™ operating system. Pentium is a registered trademark of Intel Corporation of Santa Clara, Calif. Windows 95™, Windows 98™, and Windows NT™ are all either trademarks or registered trademarks of Microsoft Corporation of Redmond, Wash.

Services tag at 504 indicates that the application requires the TCP/IP and file system services. Prerequisites tag at 506 indicates that the application Adobe Acrobat® is a prerequisite (i.e., requirement) for this application. Adobe Acrobat is a registered trademark of Adobe Systems Incorporated of San Jose, Calif.

The registry tag at 508 describes a registry entry. In this example, a Registry entry and a couple of keys are defined.

The Directory tag at 510 describes a couple of directories, the "programRoot" (which is required, but not specified by name) and a subdirectory "programRoot"/jclass.

Section 512 describes adding the programRoot directory to the path environment variable. The directory "programRoot"/jclass is also described as necessary to be added to the classpath environment variable.

The <test>. . . </test>tags in Section 512 describe tests that can be used to verify the setup of the enclosing section. This is one possible way of describing how to use application specific code to maintain an application.

With reference now to FIG. 6, a block diagram illustrating a method of automated damage detection and repair within a computing system is depicted in accordance with a preferred embodiment of the present invention. Currently, in the prior art, each application is responsible for its own integrity within a computer system. Automated facilities for detecting conflicts and resolving them, detecting damaged files or detecting missing registry entries are severely limited with prior art systems.

Conflicts and modifications to the runtime environment 100 cannot be avoided. They are the natural result of using a computer system, since the use of a computer system naturally leads to installing new applications, application updates, production and management of application artifacts, use of temporary files, and other changes in the system's configuration.

Damage detection and repair facility 602 uses the requirements defined in the working definitions 604 of all the installed applications as a set of constraints. Whenever changes occur to the runtime environment 300 or to any of the encapsulated applications, damage detection and repair facility 602 detects these changes and checks them against the set of constraints defined by the working definitions of the encapsulated applications installed on the computer system. The XML working definitions of each encapsulated application define the invariant portions of the application and the user's work which should be persisted as contrasted with temporary files that need not be persisted. An additional digitally signed section of the XML application working definition can provide insurance that checksums and files sizes for each of the application's files in the runtime environment 100 have not been modified. If a file has been modified, as detected by damage detection and repair facility 602, that file can be repaired with a signed, known valid version.

The set of files subject to inspection is very limited, since the working definitions define exactly which files should be checked. Instead of having to verify each and every file, the search can be limited to only those files the working definitions identify as critical. More exhaustive checks can be done, but the basic runtime representation verification does not require them.

Figure 7:
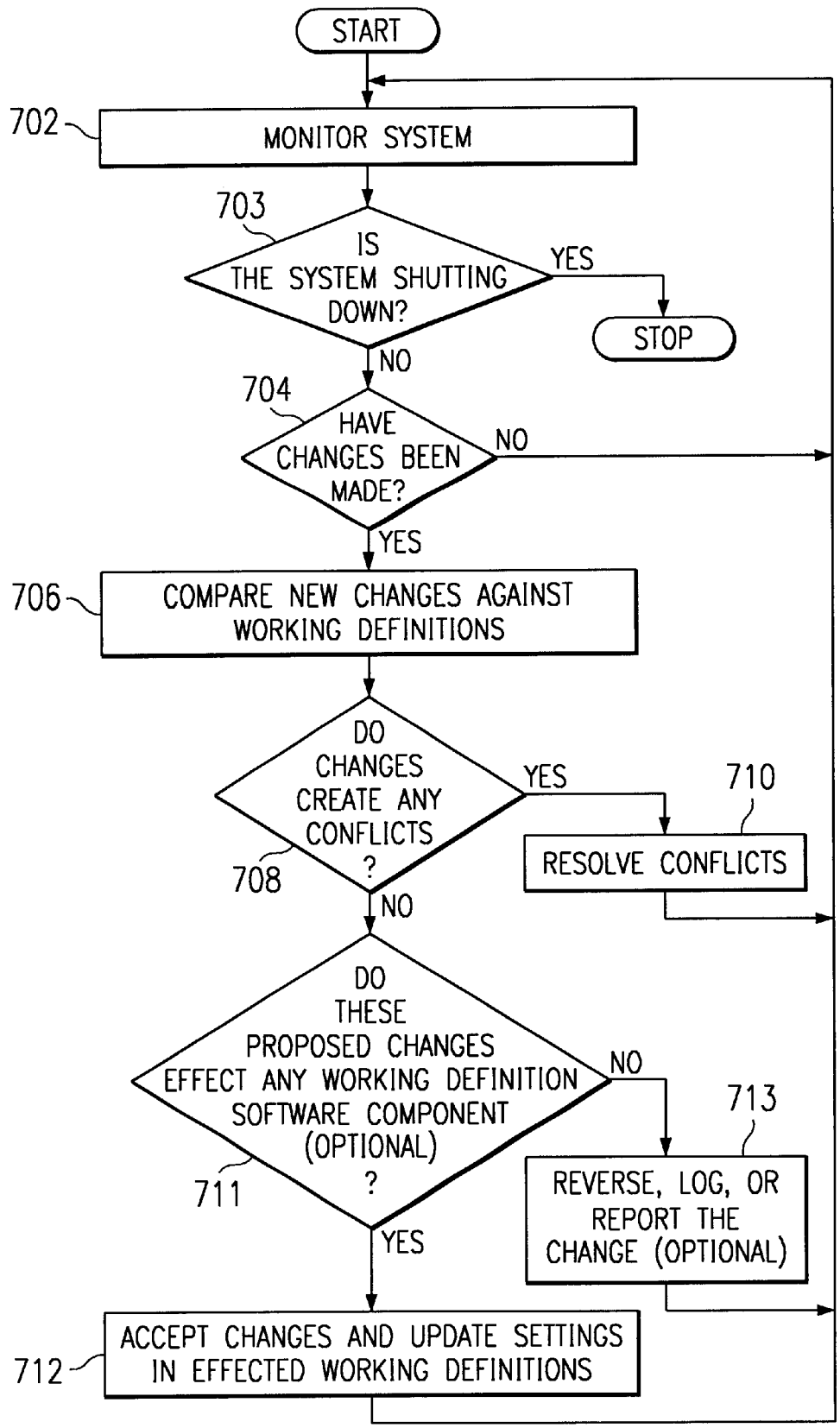
FIG. 7 depicts a flowchart illustrating an exemplary method of implementing a damage detection and repair facility in accordance with the present invention.

With reference now to FIG. 7, a flowchart illustrating an exemplary method of implementing a damage detection and repair facility, such as, for example damage detection and repair facility 602 in FIG. 6, is depicted in accordance with the present invention.

The damage detection and repair facility monitors the computer system for changes (step 702) and determines whether the data processing system has received an indication to power down (step 703). If an indication to power down the data processing system has been received, then the process ends. If no indication to power down has been received, then the damage detection and repair facility determines whether changes have been made to any files, settings or encapsulated applications (step 704). Searches can be avoided when applications use a notification facility in order to facilitate this process. However, this kind of interaction with the application is not required. If no changes have been made, then the damage detection and repair facility 602 continues to monitor the computer system (step 702).

If changes have been made to some aspect of the runtime representation of an application as defined by that application's working definition, then the damage detection and repair facility compares the change against the constraints as defined by the set of working definitions in the computer system (step 706) and determines whether the change creates any conflict (step 708). If the change effects one or more working definitions without conflict, it is recorded in the settings section for the effected application(s) (step 710). Conflicts are resolved by restoring or adjusting the runtime representations effected. Changes to temporary files and settings (as defined by the working definitions of the applications that use them) do not cause conflicts.

In systems where security is very important, an optional test (step 711) for changes outside those defined as reasonable can be made. In this optional version, if the change does not create any conflict, then the damage detection and repair facility determines whether the change effects any working definition defined software component (step 711). This is done to detect those changes outside the defined constraints of the system. If the change does effect a working definition software component, then the settings of the effected working definitions are updated (step 712). If the change does not effect any working definition defined software component, then any number of strategies may be used (step 713) to address this security concern, including reversing the changes, logging the changes for inspection later, or reporting these changes to some monitoring facility. The damage detection and repair facility then continues to monitor the system (step 702).

Thus, the working definitions of installed applications allow a computer system to be modeled as a set of applications that impose a set of constraints on the runtime representation of the computer system. These constraints define all of the elements of an application that can possibly be persisted as described above. When settings change, the damage detection and repair facility can evaluate these changes against this set of constraints as defined by the working definitions of each application. If the constraints are still met, then the settings can be recorded in the settings section of the effected working definitions. If the constraints are not met, the settings can be adjusted (and recorded) as required to restore the computer system back to its proper configuration.

It is important to note that while working definitions embody logically the totality of all of the defining characteristics of an application, the working definition may in fact be implemented as a distributed entity, rather than the single entity located on an individual machine as the present invention has been primarily described. Components of it may be accessed via links and may be physically stored on servers, hard drives, or other media and accessed over buses, the Internet, an intranet, or other channels.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of detecting and repairing damaged portions of a computer system, the method comprising:
   detecting a change to the computer system;
   comparing the change to working definitions for each application installed on the computer system; wherein the working definitions comprise a set of constraints placed upon the computer system by each application installed on the computer system; and
   responsive to a determination that the change is in conflict with the set of constraints, modifying a persistent storage so as to resolve the conflict.

2. The method as recited in claim 1, further comprising:
   responsive to a determination that the change does not create a conflict with the set of constraints, updating settings in the working definitions of effected applications.

3. The method as recited in claim 1, wherein the working definition of each application is provided by an extensible markup language representation.

4. The method as recited in claim 1, wherein the step of modifying the persistent storage comprises repairing the runtime image of an application based on an encapsulated representation of the application.

5. The method as recited in claim 1, wherein the step of modifying the persistent storage comprises repairing a damaged file using a correct version of the file from the working definition.

6. The method as recited in claim 5, wherein the correct version of the file is retrieved from a server.

7. The method as recited in claim 6, wherein the server is accessed via a network.

8. The method as recited in claim 7, wherein the network is an Internet.

9. The method as recited in claim 1, further comprising:
   responsive to a determination that the change does not create a conflict with the set of constraints, determining whether the change effects any working definition defined software component; and
   responsive to a determination that the change does not effect any working definition defined software component, reversing the change.

10. The method as recited in claim 1, further comprising:
    responsive to a determination that the change does not create a conflict with the set of constraints, determining whether the change effects any working definition defined software component; and
    responsive to a determination that the change does not effect any working definition defined software component, logging the change.

11. The method as recited in claim 1, further comprising:
    responsive to a determination that the change does not create a conflict with the set of constraints, determining whether the change effects any working definition defined software component; and
    responsive to a determination that the change does not effect any working definition defined software component, reporting the change to a monitoring facility.

12. A computer program product in computer readable media for use in a data processing system for detecting and repairing damaged portions of a computer system, the computer program product comprising:
    first instructions for detecting a change to the computer system;
    second instructions for comparing the change to working definitions for each application installed on the computer system; wherein the working definitions comprise a set of constraints placed upon the computer system by each application installed on the computer system; and
    third instructions, responsive to a determination that the change is in conflict with the set of constraints, for modifying a persistent storage so as to resolve the conflict.

13. The computer program product as recited in claim 12, further comprising:
    fourth instructions, responsive to a determination that the change does not create a conflict with the set of constraints, for updating settings in the working definitions of effected applications.

14. The computer program product as recited in claim 12, wherein the working definition of each application is provided by an extensible markup language representation.

15. The computer program product as recited in claim 12, wherein the step of modifying the persistent storage comprises repairing the runtime image of an application based on an encapsulated representation of the application.

16. The computer program product as recited in claim 12, wherein the step of modifying the persistent storage comprises repairing a damaged file using a correct version of the file from the working definition.

17. The computer program product as recited in claim 16, wherein the correct version of the file is retrieved from a server.

18. The computer program product as recited in claim 17, wherein the server is accessed via a network.

19. The computer program product as recited in claim 18, wherein the network is an Internet.

20. The computer program product as recited in claim 12, further comprising:
    fourth instructions, responsive to a determination that the change does not create a conflict with the set of constraints, for determining whether the change effects any working definition defined software component; and
    fifth instructions, responsive to a determination that the change does not effect any working definition defined software component, for reversing the change.

21. The computer program product as recited in claim 12, further comprising:
    fourth instructions, responsive to a determination that the change does not create a conflict with the set of constraints, for determining whether the change effects any working definition defined software component; and fifth instructions, responsive to a determination that the change does not effect any working definition defined software component, for logging the change.

22. The computer program product as recited in claim 12, further comprising:

fourth instructions, responsive to a determination that the change does not create a conflict with the set of constraints, for determining whether the change effects any working definition defined software component; and fifth instructions, responsive to a determination that the change does not effect any working definition defined software component, for reporting the change to a monitoring facility.

23. A system for detecting and repairing damaged portions of a computer system, the system comprising:

means for detecting a change to the computer system;

means for comparing the change to working definitions for each application installed on the computer system; wherein the working definitions comprise a set of constraints placed upon the computer system by each application installed on the computer system; and means, responsive to a determination that the change is in conflict with the set of constraints, for modifying a persistent storage so as to resolve the conflict.

24. The system as recited in claim 23, further comprising:

means, responsive to a determination that the change does not create a conflict with the set of constraints, for updating settings in the working definitions of effected applications.

25. The system as recited in claim 23, wherein the working definition of each application is provided by an extensible markup language representation.

26. The system as recited in claim 23, wherein the step of modifying the persistent storage comprises repairing the runtime image of an application based on an encapsulated representation of the application.

27. The system as recited in claim 23, wherein the step of modifying the persistent storage comprises repairing a damaged file using a correct version of the file from the working definition.

28. The system as recited in claim 27, wherein the correct version of the file is retrieved from a server.

29. The system as recited in claim 28, wherein the server is accessed via a network.

30. The system as recited in claim 29, wherein the network is an Internet.

31. The system as recited in claim 23, further comprising:

means, responsive to a determination that the change does not create a conflict with the set of constraints, for determining whether the change effects any working definition defined software component; and means, responsive to a determination that the change does not effect any working definition defined software component, for reversing the change.

32. The system as recited in claim 23, further comprising:

means, responsive to a determination that the change does not create a conflict with the set of constraints, for determining whether the change effects any working definition defined software component; and means, responsive to a determination that the change does not effect any working definition defined software component, for logging the change.

33. The system as recited in claim 23, further comprising:

means, responsive to a determination that the change does not create a conflict with the set of constraints, determining whether the change effects any working definition defined software component; and means, responsive to a determination that the change does not effect any working definition defined software component, for reporting the change to a monitoring facility.

* * * * *